(12) United States Patent
Rosario

(10) Patent No.: US 6,430,104 B1
(45) Date of Patent: Aug. 6, 2002

(54) SONAR SYSTEM PERFORMANCE METHOD

(75) Inventor: Michael A. Rosario, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/793,784

(22) Filed: Feb. 27, 2001

(51) Int. Cl.[7] .......................... H04B 17/00; G21C 17/00
(52) U.S. Cl. ...................................................... 367/13
(58) Field of Search .................... 367/13, 131; 702/182

(56) References Cited

U.S. PATENT DOCUMENTS

| | | | | |
|---|---|---|---|---|
| 4,654,835 A | * | 3/1987 | Feintuch | 367/100 |
| 4,675,147 A | * | 6/1987 | Schaefer et al. | 702/182 |
| 5,541,854 A | * | 7/1996 | Yundt | 702/182 |
| 5,734,591 A | * | 3/1998 | Yundnt | 702/182 |
| 5,828,567 A | * | 10/1998 | Eryurek et al. | 702/182 |

\* cited by examiner

*Primary Examiner*—Daniel T. Pihulic
(74) *Attorney, Agent, or Firm*—Michael J. McGowan; James M. Kasischke; Prithvi C. Lall

(57) ABSTRACT

A method is disclosed for evaluating and/or selecting sonar systems and sonar sensors is provided that results in a performance rating that represents both the magnitude and consistency of detection of targets positioned at different depths. In a preferred embodiment wherein a sonar system includes at least one source and at least one receiver, the performance rating related to target detection, is plotted for each of a plurality of source and receiver depths. A dynamic range sensitivity factor is selected that provides sensitivity in the performance rating with respect to consistency of the detection range at different depths. The dynamic range sensitivity factor is preferably selected between zero and an inverse of a scaling factor related to a maximum detection range and a minimum detection range for a particular source and receiver depth relationship.

17 Claims, 2 Drawing Sheets

SONAR SYSTEM PERFORMANCE METHOD

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to acoustic sonar systems and, more specifically, to methods for evaluating, comparing, and selecting sonar system configurations and sonar sensors.

(2) Description of the Prior Art

Variable depth sonar arrays are routinely tested at a variety of depths to determine their system performance. Sonar performance may vary greatly with depth because of changes in factors that affect the sensors such as temperature and depth. Typically, near the surface, temperature is the primary consideration. As the depth increases, then pressure has a greater influence on performance as temperature becomes more uniform. At intermediate depths, ducts form which can trap transmitted acoustic waves and allow them to propagate for large distances. Moreover, if the transmitting and receiving sensors in a sonar system are at widely varying depths, then acoustic boundaries caused by pressure and temperature may interfere with sound wave reception. An acoustic sonar system may also vary with respect to the organization or sensors within the array.

More specifically, sensor and system performance is determined by performing a variety of tests at various ranges and depths. The purpose of the tests is to determine the maximum range of reception for a given depth. Often the maximum range values are averaged together to provide a value which represents the combined sensor performance. This may lead to an incorrect evaluation because the sensor may have an exceptionally large range value within a duct which will overshadow lesser values at other depths.

As an example for evaluating a sonar system in a surface layer environment, a sonar system that maintains both transmitting and receiving sensor arrays in the surface layer may normally achieve a relatively large detection range for a target that also appears in the surface layer but may produce comparatively small detection ranges for targets that are situated below the surface duct. When the result of all target depths are combined in a simple average or referenced to a statistical measurement such as standard deviations, the outcome may be skewed by the shallow event. Standard deviations give a value indicating the closeness of the data to the average and so standard deviation is meaningless without a reference to the average value. Accordingly, whenever standard deviation is provided, the average is provided.

Use of standard deviation techniques also results in difficulty of comparison. For instance, one system may average fifteen kiloyards (fifteen thousand yards) with a standard deviation of three kiloyards. The next system may average sixteen and one-half kiloyards with a standard deviation of four kiloyards. With this type of comparison, there is no clear answer as to which is the better system. Moreover, these results are difficult to plot due to extra dimensions as compared with a single performance rating.

The result is that prior art methods for comparing sonar sensors and sonar sensor systems may lead to an unrealistic or inaccurate appraisal of the system's detection capability against targets at all water depths and may cause selection of a less desirable sonar system.

Prior art patents that relate to this topic include the following:

U.S. Pat. No. 5,734,591, issued Mar. 31, 1998, to John C. Yundt, (hereinafter, Yundt '591) discloses a method for analyzing biochemical samples or human bodily fluids which operates over at least two ranges. The method of Yundt '591 comprises obtaining a first set of test results relating to the biochemical samples from the testing device over at least two ranges, and calculating from the first set of test results an individual range mean for each of the at least two ranges. The method also includes obtaining a second set of test results relating to the biochemical samples from a group of testing devices that operate over the at least two ranges, calculating from the second set of test results a group range mean and a group range standard deviation for each of the at least two ranges, and calculating standard deviation indexes for the testing device from the individual range means, the group range means and group range standard deviations. The method further comprises forming generally parallel spaced apart data range axes, each relating to a range of operation of the testing device, to facilitate analysis of the performance of the testing device over each range of operation, wherein the respective positions of the data range axes in relation to one another are scaled based on the values of the operating ranges, and then plotting all of the standard deviation indexes in relation to the data range axes in such a way that, analysis of the performance of the testing device over the at least two operating ranges is provided in a single graphic display.

U.S. Pat. No. 5,541,854, issued Jul. 30, 1996 to John C. Yundt, discloses a method and graph for analyzing the performance of a testing device that operates over at least two ranges related to the above U.S. Pat. No. 5,734,591, to the same inventor.

U.S. Pat. No. 5,828,567, issued Oct. 27, 1998, to Eryurek et al., discloses a transmitter in a process control system including a resistance sensor sensing a process variable and providing a sensor output. Sensor monitoring circuitry coupled to the sensor provides a secondary signal related to the sensor. Analog-to-digital conversion circuitry coupled to the sensor output and the sensor monitoring circuitry provides a digitized sensor output and a digitized secondary signal. Output circuitry coupled to a process control loop transmits a residual life estimate related to residual life of the sensor. A memory stores a set of expected results related to the secondary signal and to the sensor. Diagnostic circuitry provides the residual life estimate as a function of the expected results stored in a memory, the digitized sensor output and the digitized secondary signal.

U.S. Pat. No. 4,675,147, issued Jun. 23, 1987, to Schaefer et al, discloses the real time actual and reference values of parameters pertinent to the key safety concerns of a pressurized water reactor nuclear power plant which are used to generate an integrated graphic display representative of the plant safety status. This display is in the form of a polygon with the distances of the vertices from a common origin determined by the actual value of the selected parameters normalized such that the polygon is regular whenever the actual value of each parameter equals its reference value despite changes in the reference value with operating conditions, and is an irregular polygon which visually indicates deviations from normal otherwise. The values of parameters represented in analog form are dynamically scaled between the reference value and high and low limits which are displayed as tic marks at fixed distances along spokes radiating from the common origin and passing through the vertices. Multiple, related binary signals are displayed on a single spoke by drawing the associated vertice at the reference value when none of the represented conditions exist and at the high limit when any such condition is detected. A regular polygon fixed at the reference values aids the operator in detecting small deviations from normal and in gauging the magnitude of the deviation. One set of parameters is selected for generating the display when the plant is at power and a second set reflecting wide range readings is used the remainder of the time such as following a reactor trip. If the quality of the status, reference or limit signals associated with a particular vertex is "bad", the sides of the polygon emanating from that vertex are not drawn to appraise the operator of this condition.

In summary, while the prior art shows various methods for making comparisons, the above disclosed prior art does not show a suitable method for comparing sonar sensors or sonar sensor systems. Consequently, there remains a need for a system that provides a single performance rating that accounts for both the average and deviation from the average for performance at different target depths which may be plotted for different sender/receiver depth configurations. Those skilled in the art will appreciate the present invention that addresses the above and other problems.

SUMMARY OF THE INVENTION

Accordingly, it is an object of the present invention to provide an improved method for comparing acoustic sensors and acoustic sensor systems.

It is yet another object of the present invention to provide a method of comparison of acoustic sensors and acoustic systems that provides a single performance rating that takes into effect the depth sensitive nature of performance of the acoustic sensors and acoustic sensor systems.

These and other objects, features, and advantages of the present invention will become apparent from the drawings, the descriptions given herein, and the appended claims.

A method is provided for evaluating and/or selecting a sonar system wherein the sonar system comprises at least one sender and at least one receiver. The method includes such steps as positioning the sender and the receiver at a plurality of sensor depths wherein tests are performed for each of the plurality of sensor depths. For instance in one test, the sender may be located at a one hundred foot depth and the receiver at a three hundred foot depth. In a subsequent test, both the sender and receiver may be at a two hundred foot depth. Different sonar system configurations which may comprise only one sender/receiver or may comprise sensor arrays or different sonar systems can be evaluated as discussed below.

For each of the plurality of sensor depths or sonar system configurations, a target may be positioned at a plurality of target depths. For each of the plurality of target depths, a detection range is determined for the sonar system, e.g., twenty kiloyards at one target depth, eighteen kiloyards at another target depth, and so on. An average detection range is determined.

Moreover, a scaling factor related to a ratio of the dynamic range to the maximum range is produced. A dynamic range sensitivity weighting term is selected. The value of the dynamic range sensitivity weighting is typically but not necessarily selected to be between zero and one. Preferably, the range weighting term is selected to be no greater than the smallest value of the inverse of the scaling factor.

For each of the plurality of sensor depths, a performance rating is produced from the average detection range, the dynamic range, the maximum detection range, the minimum detection range, and the dynamic range sensitivity weighting term. More specifically, the minimum detection range may be subtracted with respect to the average detection range to provide a first factor. The dynamic range sensitivity weighting term may be multiplied with respect to the first factor to obtain a second factor. The scaling factor may be multiplied with respect to the second factor to obtain a dynamic range factor. Then the dynamic range factor may be subtracted with respect to the average detection range to provide a performance rating.

As noted above, the performance rating is preferably determined with respect to each of the plurality of sensor depths. In one preferred embodiment, the performance rating may be plotted for each of the plurality of sensor depths.

With respect to comparison and selecting purposes, it is desirable to utilize a constant value for the range weighting term for each of the plurality of sensor depths and/or for each sonar system or sonar system components to be tested.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

BRIEF DESCRIPTION OF THE PREFERRED EMBODIMENTS

Figure 1:
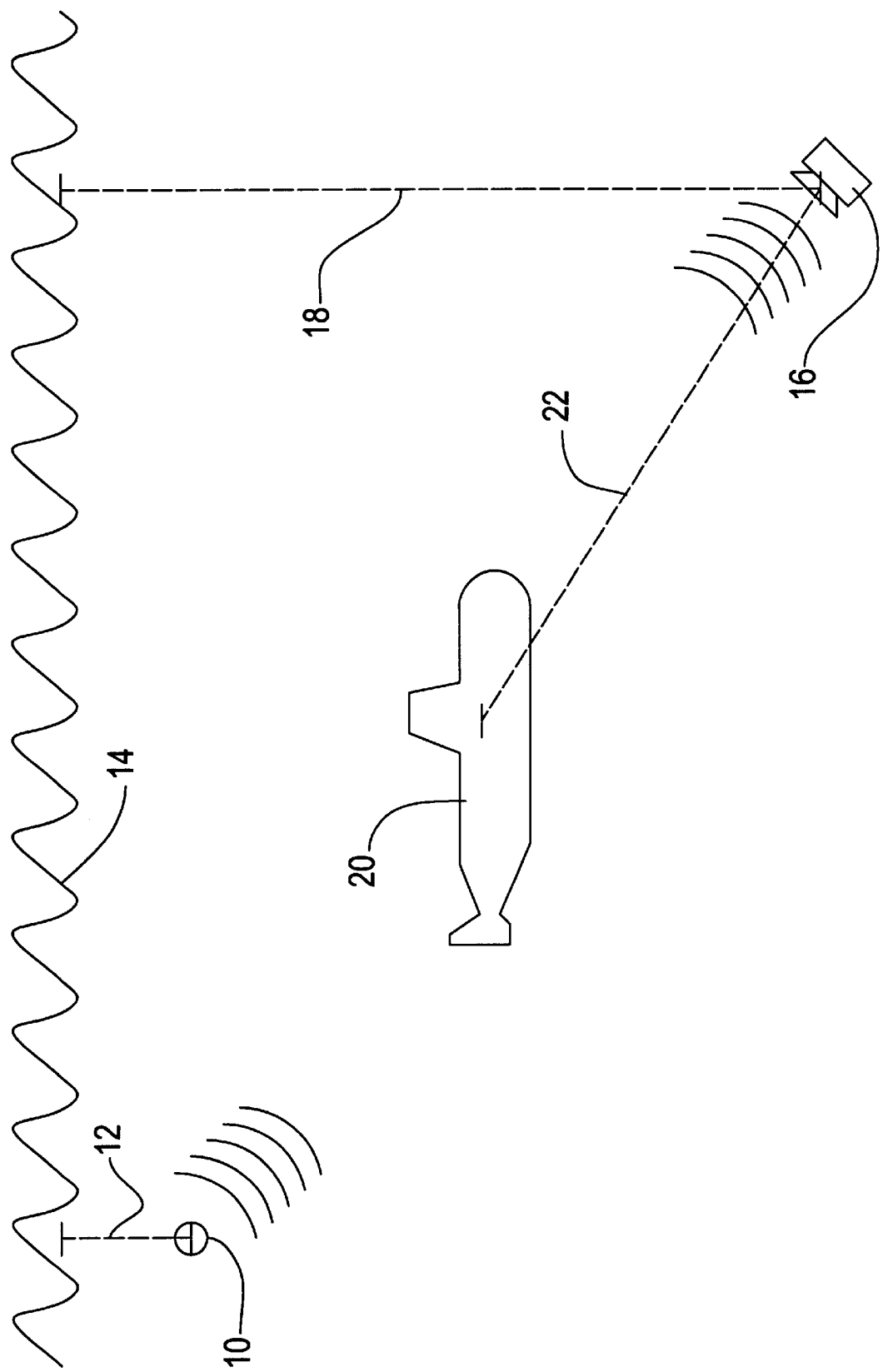
FIG. 1 is a diagram showing a typical test set up for gathering data used in calculating the subject performance rating.

Referring now to the drawings, in FIG. 1 there is shown the test setup for developing the performance measure of the current invention. An acoustic transmitter 10 is positioned at a transmitter depth 12 below the surface 14 of a body of water. An acoustic receiver 16 is positioned at a receiver depth 18 below the surface 14. A target 20 is also located below the surface 14 at a range 22 away from the receiver 16. During testing, transmitter 10 is positioned at transmitter depth 12 where it transmits an acoustic signal which bounces off of target 20 and is received at receiver 16. Data is collected concerning reception at range 22, transmitter depth 12, and receiver depth 18. This process is repeated for various transmitter and receiver depths.

Figure 2:
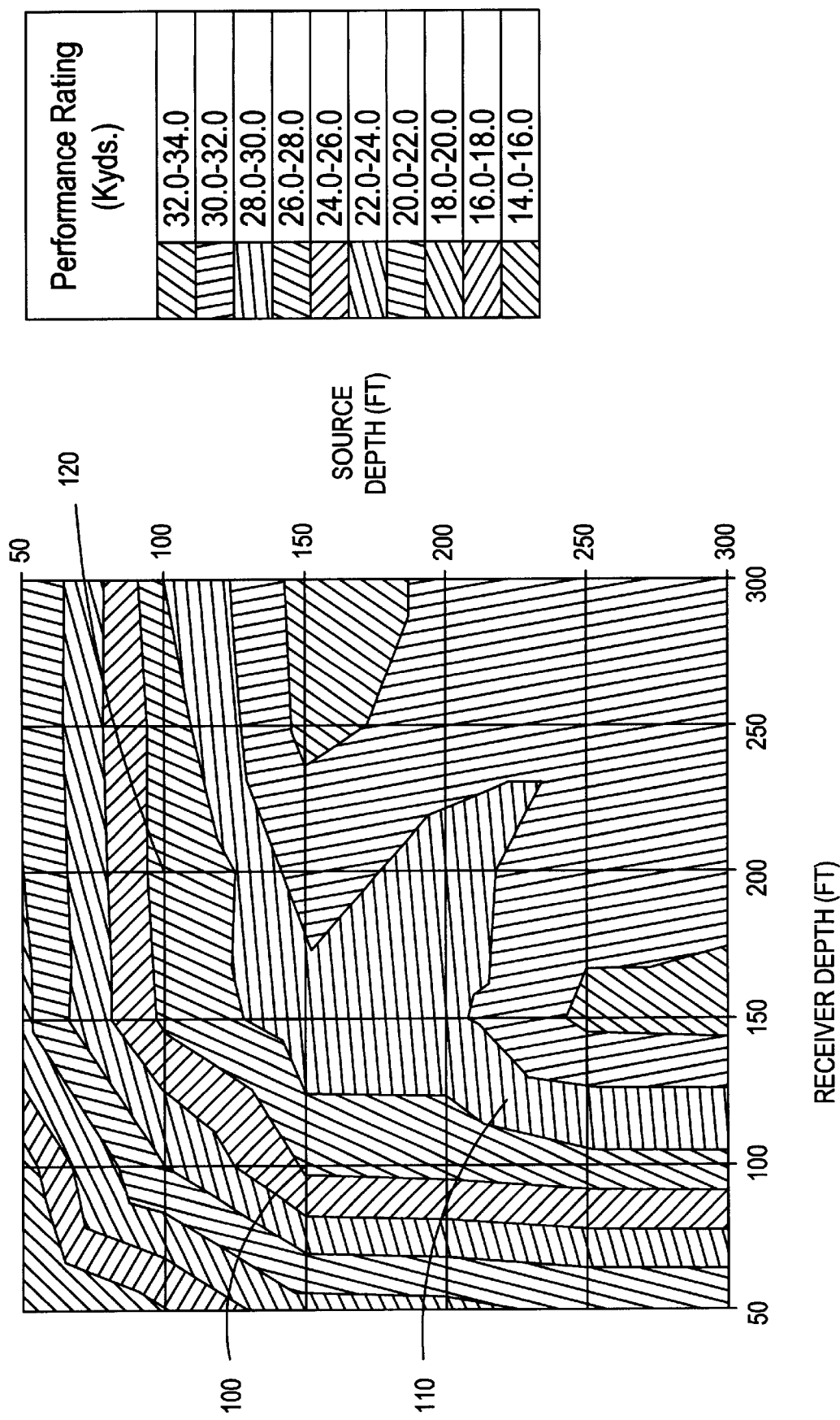
FIG. 2 is a graph showing a performance rating in accord with the present invention plotted to illustrate the performance of a source and a receiver positioned at different depths.

Referring now to FIG. 2 there is shown one use of the system of the present invention for a simplified visual display. The performance rating, as discussed in detail subsequently, is plotted for various depths of the source and receiver and may typically be a value in terms of thousands of yards (kiloyards). At respective source and receiver depths that may be selected from the plot of FIG. 2, a plurality of tests have been made wherein the target depth varied and the respective target ranges were determined whereupon a performance rating was made as discussed hereinafter. Different cross hatching types in FIG. 2 relate to different performance ratings. For instance, at point 100, the source depth is 150 ft. and the receiver depth is 100 ft. and the performance rating is in the range of 26–28 kiloyards. The performance rating is based on both the magnitude and uniformity of detection ranges achieved for targets at a variety of water depths. At point 110, the source depth is about 220 ft. and the receiver depth about 125 ft. and the performance rating is 28–30 kiloyards. Taking another point 120, the source depth is 100 ft. and the receiver depth is 200 ft. and the performance rating is 26–28 kiloyards. The various layers of the performance ratings as plotted may be in color or otherwise distinguished. Different source/receiver pairs or the same pair at different positions may be evaluated and compared in this manner.

The performance rating of the present invention evaluates the overall performance of a sonar system by using both the magnitude and the consistency of detection performance achieved for targets within a predetermined range of water depths. The performance rating of the present invention is based on depth sensitive system performance and may preferably utilize a user adjusted dynamic range weighting function for appropriate weighting of the outcome of depth averaged detection ranges.

A dynamic range factor, DR, is given by the following equation:

$$DR = \left(\left(\frac{SD}{NS} - SR\right) * W\right) * \left(\frac{MR - SR}{MR}\right) \quad (1)$$

where:
SD=Sum of the detection ranges at all target depths;
SR=Smallest detection range;
MR=Largest detection range;
NS=Number of detection range samples;
W=Dynamic range sensitivity weighting term. (0=Low Sen., 1 =High Sen.)

The right most term of the above equation is merely a scaling factor. The performance rating is given as:

$$\text{Performance Rating} = \frac{SD}{NS} - DR \quad (2)$$

For the results of FIG. 2, the performance rating and each term refers to a source-receiver pair at a particular depth configuration. In this case, the determination should be performed for each source and receiver depth combination to be modeled within the same specific environment. The highest performance ratings for different types of source receiver pairs or for a particular depth combination of a specific pair will be based upon achieving the best combination of the magnitude of the detection ranges and consistent performance across the depth ranges.

As will be appreciated from review of the above equation with respect to a particular source and receiver depth combination, the performance rating is computed by first finding the average (mean) for all modeled target depths. Subtracted from this average detection range is a dynamic range weighting function that is composed of the average detection range, the minimum detection range, the maximum detection range, the dynamic range, and a dynamic range sensitivity weighting term, "W". The dynamic range sensitivity weighting term W is a user defined value, which can be chosen to be as small as zero, rending no sensitivity to dynamic range (pure mean values). On the other hand, the term W could be as large as one (and in some cases more than one), which produces a very high sensitivity to dynamic range in the performance results. For comparison of the same source receiver pair at different depths, and for comparison of different types of source receiver pairs, the same W is preferably used.

In general, when the sum of the detection ranges is large, the outcome of the performance rating will also be large. However, if the individual magnitudes of detection range vary a great deal with depth, then the dynamic range will grow to significant proportions and the performance rating will be reduced by a correspondingly large amount. If under a different set of circumstances, the same total sum of detection ranges is achieved but with relatively small variations in individual system performance, then the dynamic range weighting function will be small and a larger performance rating will ultimately result. One other important consideration is that the outcome of the performance rating is most reliable when the data being analyzed contains a sufficient number of target-depth samples to accurately reflect the particular system's performance capabilities across the entire range of the target's potential operating depths.

As stated hereinbefore, the smaller the value assigned to W (low sensitivity), the more the performance rating will approach the simple mean of the detection ranges. Conversely, the greater the assigned value of W (high sensitivity), the more the performance rating will tend towards the smallest detection range in the target depth data set. In fact, if W is selected to be greater than one, it is possible, when accompanied by large dynamic range, to produce a performance rating that is actually less than the smallest detection range that appears in the target depth data set. Therefore, the user must exercise care when specifying values of W that are greater than one to insure that the performance rating is within the bounds of a reasonable set of results for a particular data set. Generally, W should be no greater than the smallest inverse scaling factor or MR/(MR−SR) that appears in any of the data sets being evaluated or compared. If W was greater than the smallest inverse scaling factor, then the performance rating could be less than the smallest value in the set. If the performance measurement was less than the smallest value in the set, this may result in an inaccurate view of the data. The same weighting values, W, should be used when comparing different sonar systems to obtain a valid basis for comparison.

In summary, tests related to target depth and detection range are taken for each sonar system configuration. For instance, if the sonar system comprises a single source and receiver, then for each source depth and receiver depth to be considered, target depth and detection range tests are performed. Generally it is desirable to test at several different target depths to produce more complete information from which an evaluation or selection may be made. The dynamic range weighting factor W is selected and preferably maintained as a constant. The value of the performance rating can be plotted as in FIG. 2 for each sonar system variation such as source depth versus receiver depth.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for evaluating a sonar system, said sonar system comprising at least one sender and at least one receiver, said method comprising:

positioning said at least one sender and said at least one receiver at a plurality of sensor depths;

positioning a target at a plurality of target depths for each of said plurality of sensor depths;

determining a detection range for each of said plurality of sensor depths for said at least one sender and said at least one receiver;

finding a maximum detection range and a minimum detection range from said determined detection ranges;

summing said detection ranges for each of said plurality of sensor depths to produce a detection range sum and dividing said detection range sum by a number representative of a number of said plurality of target depths to produce an average detection range;

determining a range difference for each of said plurality of sensor depths between said maximum detection ranges and said minimum detection ranges and dividing said range difference by said maximum range to produce a scaling factor;

selecting a range weighting term; and producing a performance rating for each of said plurality of sensor depths from said average detection range, said scaling factor, said minimum detection range, and said range weighting term.

2. The method of claim 1 further comprising the step of subtracting said minimum detection range from said average detection range to provide a first factor.

3. The method of claim 2 further comprising the step of multiplying said range weighting term with respect to said first factor to obtain a second factor.

4. The method of claim 3 further comprising the step of multiplying said scaling factor times said second factor to obtain a dynamic range factor.

5. The method of claim 4 further comprising the step of subtracting said dynamic range factor from said average detection range to provide a performance rating for each of said plurality of sensor depths.

6. The method of claim 5 further comprising the step of plotting said performance rating for each of said plurality of sensor depths.

7. The method of claim 1 wherein said range weighting term is selected to be between zero and one.

8. The method of claim 1 wherein said range weighting term is selected to be no greater than a minimum inverse of said scaling factor.

9. The method of claim 1 wherein a constant value is utilized for said range weighting term for each of said plurality of sensor depths.

10. A method for evaluating a plurality of sonar system configurations, said method comprising:

positioning a target at a plurality of target depths for each of said plurality of sonar system configurations;

determining a detection range for said target for each of said plurality of target depths;

determining an average detection range from said detection range for each of said plurality of sonar system configurations for each of said plurality of target depths;

finding a maximum detection range and a minimum detection range from said determined detection ranges;

determining a scaling factor for each of said plurality of sonar system configurations from said maximum detection range and said minimum detection range from said detection range for each of said plurality of target depths;

selecting a range weighting term from between zero and an inverse of said scaling factor; and producing a performance rating from said average detection range, said scaling factor, said minimum detection range, and said range weighting term for each of said plurality of sonar system configurations.

11. The method of claim 10 further comprising the step of subtracting said minimum detection range with respect to said average detection range to provide a first factor.

12. The method of claim 11 further comprising the step of multiplying said range weighting term with respect to said first factor to obtain a second factor.

13. The method of claim 12 further comprising the step of multiplying said scaling factor times said second factor to obtain a dynamic range factor.

14. The method of claim 13 further comprising the step of subtracting said dynamic range factor with respect to said average detection range to provide a performance rating with respect to each of said plurality of sonar system configurations.

15. The method of claim 14 further comprising the step of plotting said performance rating for each of said plurality of sonar system configurations.

16. The method of claim 10 wherein said range weighting term is selected to be between zero and one.

17. The method of claim 10 wherein a constant value is utilized for said range weighting term for each of said plurality of sonar system configurations.

* * * * *